Aug. 21, 1928.

G. T. BOYNTON 1,681,278

PNEUMATICALLY CONTROLLED AIR VALVE

Filed Sept. 1, 1926    4 Sheets-Sheet 1

INVENTOR,
Garwood T. Boynton,
BY Horace S. Smith
His ATTORNEY.

Aug. 21, 1928.

G. T. BOYNTON 1,681,278

PNEUMATICALLY CONTROLLED AIR VALVE

Filed Sept. 1, 1926      4 Sheets-Sheet 2

INVENTOR,
Garwood T. Boynton,
BY Honard S. Smith
ATTORNEY.

Aug. 21, 1928. 1,681,278
G. T. BOYNTON
PNEUMATICALLY CONTROLLED AIR VALVE
Filed Sept. 1, 1926 4 Sheets-Sheet 4

INVENTOR,
Garwood T Boynton
BY Howard P. Smith
ATTORNEY.

Patented Aug. 21, 1928.

1,681,278

UNITED STATES PATENT OFFICE.

GARWOOD T. BOYNTON, OF DAYTON, OHIO, ASSIGNOR OF ONE-HALF TO MORRIS L. HAHN, OF DAYTON, OHIO.

PNEUMATICALLY-CONTROLLED AIR VALVE.

Application filed September 1, 1926. Serial No. 132,948.

This invention relates to new and useful improvements in pneumatically-controlled air valves.

It is the principal object of my invention to provide for air brakes and the like, a simple and efficient valve for automatically maintaining upon them an air pressure which is predetermined.

It is another object of my invention to provide means for applying air pressure to the brakes gradually to prevent an automobile or other vehicle equipped with them from skidding, which would occur if full air pressure were applied abruptly.

Other important and incidental objects will be brought out in the following specification and particularly set forth in the subjoined claims.

Figure 1:
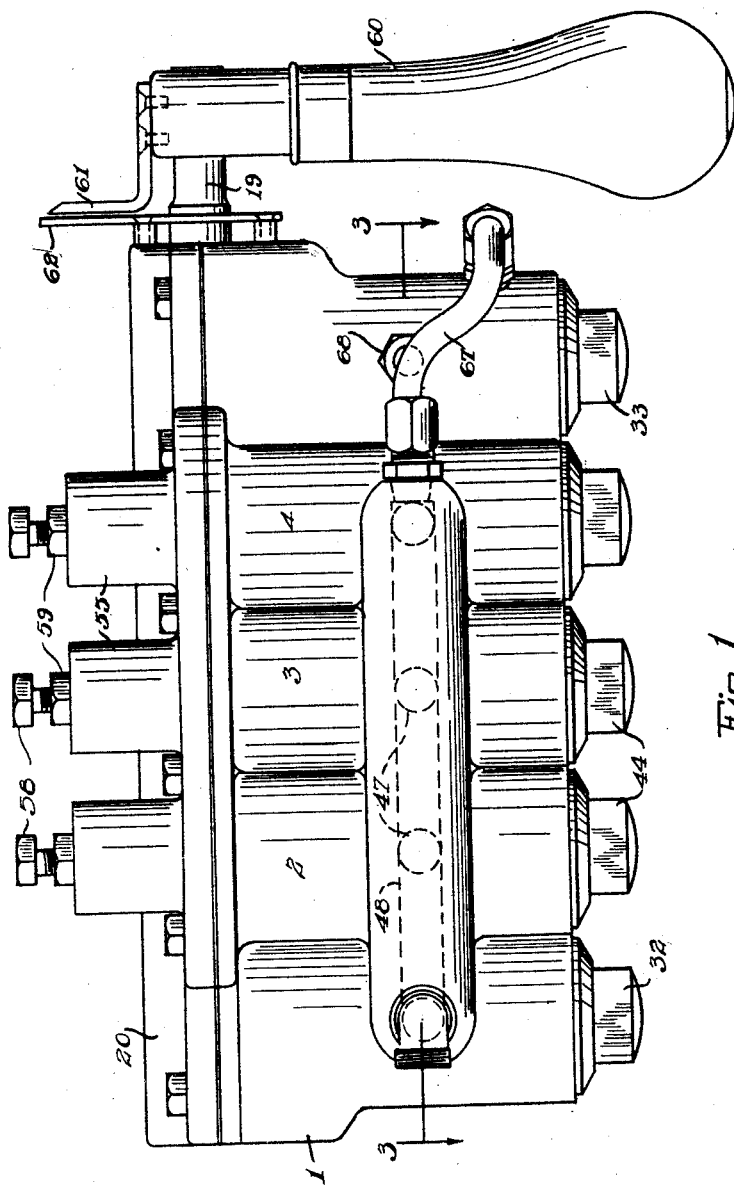
Figure 2:
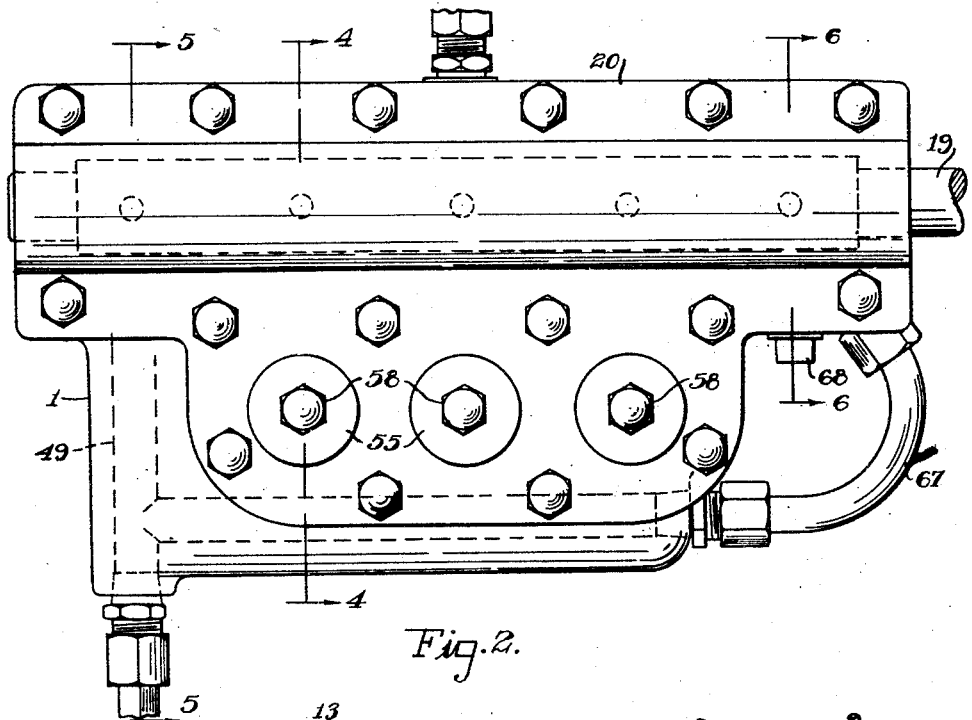
Figure 3:
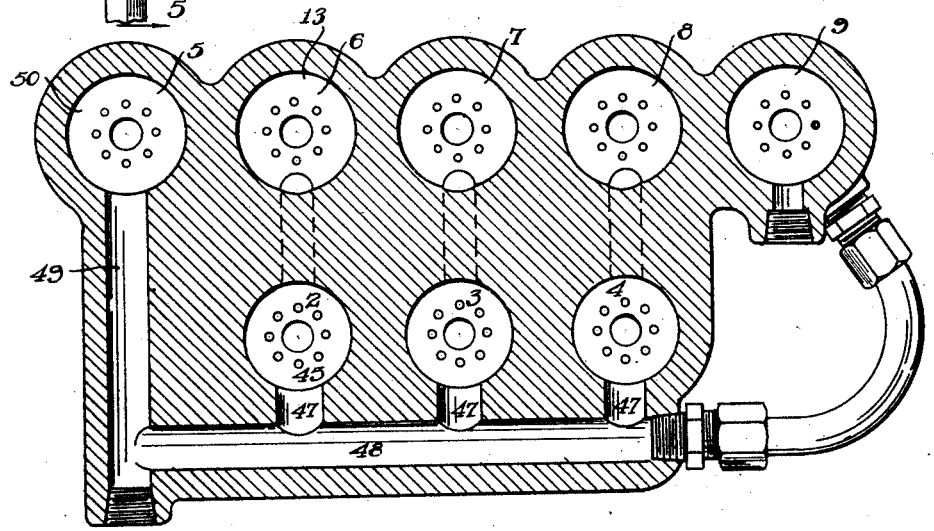
Figure 5:
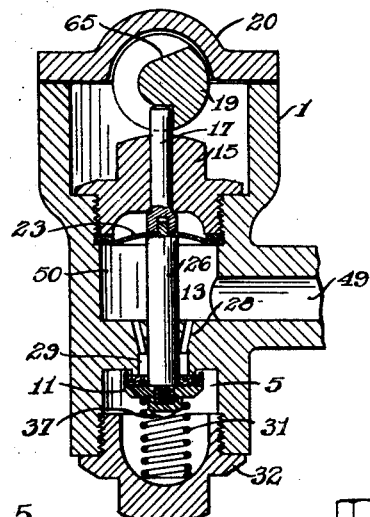
Figure 6:
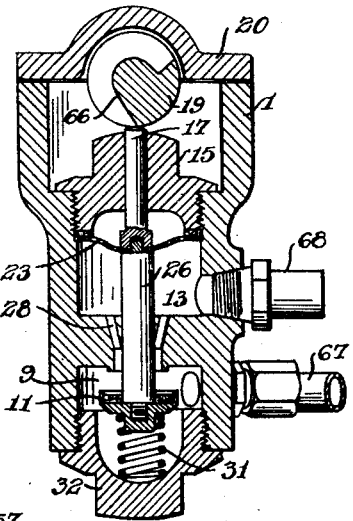
Figure 4:
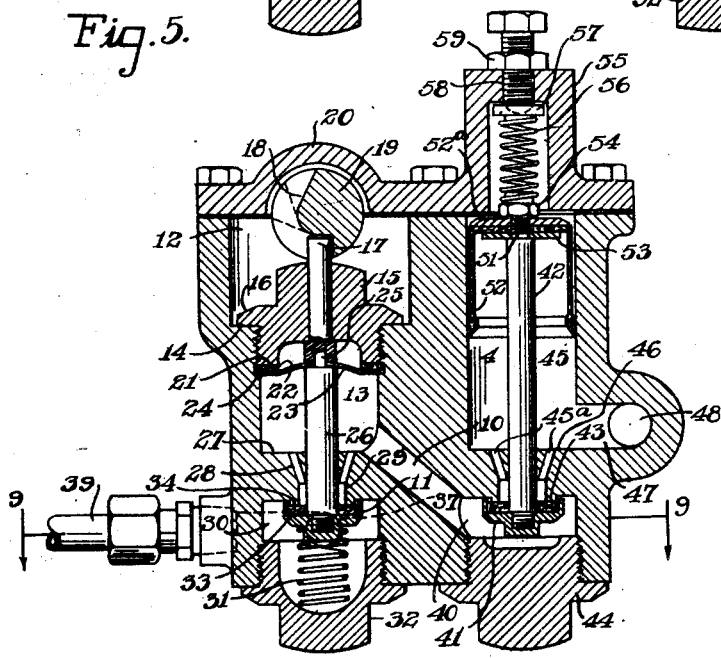
Figure 7:
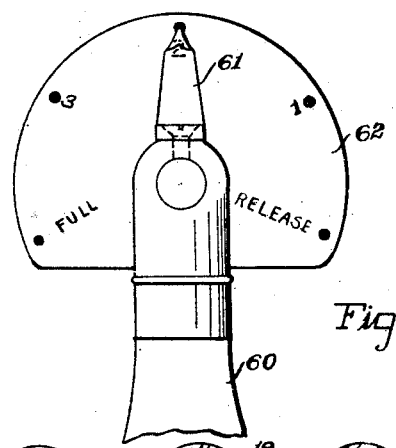
Figure 8:
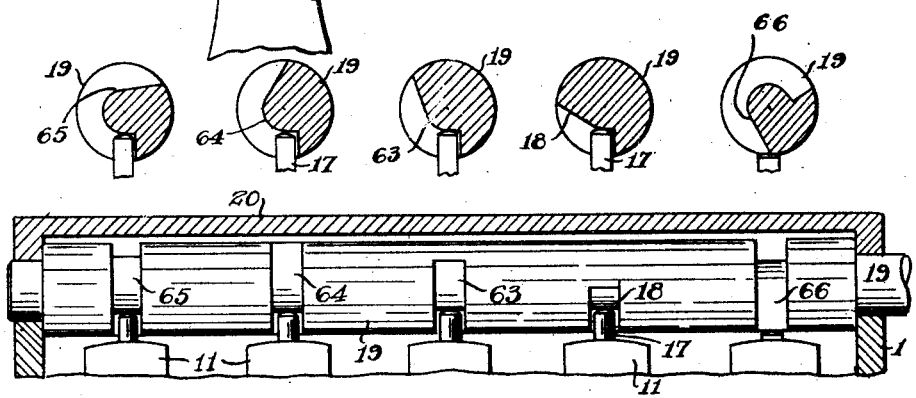
Figure 9:
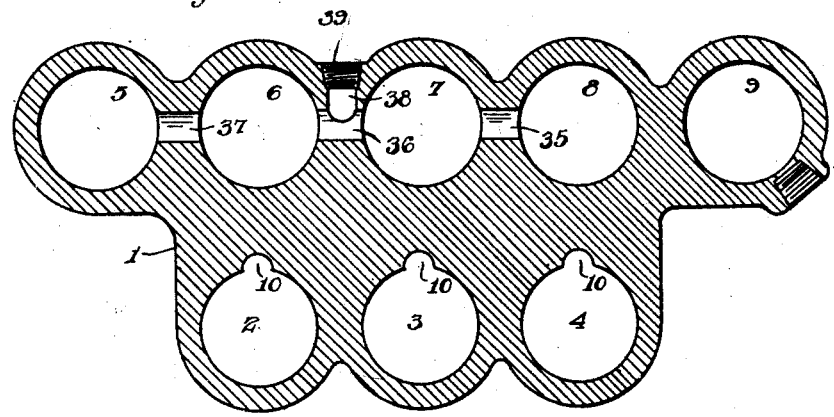

In the accompanying drawings, Figure 1 is a side elevational view of my single-unit automatic valve means. Figure 2 is a plan view of the same. Figure 3 is a sectional view taken on the line 3—3 of Figure 1. Figure 4 is a sectional view taken on the line 4—4 of Figure 2. Figure 5 is a sectional view taken on the line 5—5 of Figure 2. Figure 6 is a sectional view taken on the line 6—6 of Figure 2. Figure 7 is a view of the indicator dial. Figure 8 is a view of the cams and cam shaft, partly in section. And Figure 9 is a sectional view taken on the line 9—9 of Figure 4.

Referring to the accompanying drawings for a detailed description of my invention, the numeral 1 designates a casting including three front chambers or cylinders 2, 3 and 4 to contain the pneumatically-controlled valves, and five rear chambers or cylinders 5, 6, 7, 8 and 9 to contain the manually-controlled valves. If it is desired to increase or decrease the number of these valves, which will be hereinafter described, a greater or a less number of chambers to contain them may be provided in the block 1 without departing from the spirit of the invention.

For the purpose of admitting compressed air in varied proportions through ports 10 in the cylinder block 1 to the secondary chambers 2, 3 and 4, I provide in each one of the primary chambers 6, 7 and 8 a valve 11 which, together with its operating means, will now be described.

Referring to Figure 4, each one of the cylinders 6, 7 and 8 is formed at its top with a bore 12 of larger diameter than a lower bore 13 to provide an annular shoulder 14. Immediately below the latter the bore 13 of the cylinder is threaded to receive a threaded cap 15 formed with a flange 16 immediately above said shoulder. This cap 15 contains an axial hole through which the upper section 17 of the stem of the valve 11 is free to be depressed by the cam surface 18 of a cam shaft 19. This shaft is journaled in split bearings formed between the ends of the cylinder block 1 and the ends of a cover plate 20 secured to the latter. (See Figures 2 and 8.)

The cap 15 is concaved at its middle bottom portion to form an annular projection 21 which is adapted to press a gasket 22 against the ends of a rubber diaphragm 23 which rest upon a narrow annular shoulder 24 formed in the middle portion of the cylinder bore 13. The diaphragm 23 is formed with a central hole through which there projects a threaded projection 25 on the lower section 26 of the stem of the valve 11. This projection 25 is adapted to be screwed into an axial hole in the lower enlarged end of the upper section 17 of the valve stem to connect the lower and upper sections together, with the diaphragm firmly compressed between them to form a seal against the escape of air into the upper portion of the cylinder.

The lower section 26 of the valve stem passes through a hole in the cylinder head portion 27 in which there are also formed, around said hole, inclined ports 28 to permit the entrance of air into the cylinder space between said head portion and the diaphragm 23. At their lower ends these ports 28 communicate with a hole 29 that is of greater diameter than the stem section 26, said hole in turn communicating with a wide recess 30 in the bottom of the casting 1 to receive the valve head 11 and a helical spring 31 which at its upper end bears against the latter. The lower end of the spring is seated upon the bottom of a concave portion of a plug 32 which is screwed into the recessed portion 30 of the casting. (See Figure 4.)

The top portion of the valve head 11 is recessed to receive a washer 33 made of fibrous material for yielding contact with a seat 34. The spring 31 is maintained under sufficient tension to effect this contact in the absence of a downward pressure exerted upon the valve through the engagement of the cam shaft 19 with the sectional stem of the valve just described.

Air under compression is admitted to the space around the valve 11 in the lower part of the chamber 8 through a port 35 that communicates with the chamber 7. (See Figure 9.) The latter chamber in turn communicates with the chamber 6 through a port 36, and through a port 37 the chamber 6 communicates with the chamber 5. Communicating with the middle port 36 is a tapped hole 38 which receives a pipe tap 39 of a connection leading to an air compressor or storage tank (not shown).

Compressed air admitted by the valve 11 to one of the primary chambers 6, 7 and 8, passes to its corresponding secondary chamber 2, 3 or 4 through a connecting port 10. Referring again to Figure 4 for a description of one of these secondary chambers, which are employed to automatically maintain upon the brake line a predetermined air pressure, the numeral 40 indicates the space in the casting 1 to which the port 10 leads from the chamber 8. The space 40 encloses a valve 41, similar to the valve 11, that is carried by the lower threaded end of an elongated rod or stem 42 and which seats against an annular projection 43 within the casting. Below the valve 41 a threaded plug 44 is screwed into the casting to close the space 40 from below.

When the valve 41 is depressed below its seat 43 by means soon to be described, the air which is admitted to the space 40 by the port 10 will pass into a recess 45 above said valve in the casting, and thence through inclined ports 45ª in a cylinder head portion 46 into the chamber or cylinder 4. Through a port 47 this air will flow into a lateral passage 48 formed in the casting 1, and with which the other secondary valve chambers are put in communication through similar ports 47. (See Figure 3.) This passage 48 discharges at one end into a port 49 which at one end is in communication with a full pressure chamber 50 and which at its other end receives a connection for the delivery of said compressed air to a brake line (not shown).

For the purpose of automatically maintaining upon the brake line a predetermined air pressure when air is admitted to it from its corresponding primary chamber, the secondary chamber 4, or any other secondary chamber, contains a valve stem 42 which is formed at its upper end with a threaded projection 51 that passes through a hole in the top of a vertically movable bell-shaped sleeve 52 whose periphery is adapted to be pressed tightly against the wall of the chamber 4 by the air pressure within the latter, to prevent the passage of air above it. To assist in sealing the upper portion of the chamber against the escape of this air, a fibrous washer 52ª is pressed against the upper side, and a washer 53 drawn against the under side, of the top of the sleeve 52 by a nut 54 in the upper end of the threaded projection 51 on the valve stem. (See Figure 4.)

Formed on the cover plate 20 above the sleeve 52 is a raised spring-housing 55 which contains a helical spring 56 that is interposed between a disc 57 and the top of the sleeve. This spring 56 is put under tension by a stud 58 that is screwed through a hole in the top of the spring housing portion 55 of the cover plate 20, into engagement with the recessed middle part of the disc 57, and is held under its adjusted tension by a lock nut 59 on the stud.

If this spring 56 is tensioned for ten pounds pressure, then the air delivered to the brake line by the chamber 4 will be automatically maintained at ten pounds pressure. Should the pressure of the air in the chamber 4, through a leak in the brake line or for any other reason, fall below a pressure of ten pounds, then the valve 41 will be forced below its seat by the spring 56 a sufficient distance to admit enough air from the space 43 to bring the air pressure within the chamber up to this minimum. And when the air pressure within the chamber 4 is at, say, this ten pounds minimum, then it will exert sufficient force against the inner top part of the sleeve 52 to maintain the valve 41 in a position, against the tension of the spring 56, to maintain this pressure upon the brake line.

If, for example, the springs 56 in the chambers 3 and 2 are tensioned for 20 and 30 pounds pressure respectively, then the air sent to them from their corresponding primary chambers 7 and 6 will be continuously delivered to the brake line at those pressures. Therefore, it will be seen that the air pressure put upon the brake line by any one of the secondary chambers 2, 3 or 4, will be continuously maintained at the pressure for which the spring 56 in any one of them has been set.

For the purpose of conveniently rotating the cam shaft 19 to open any one of the primary valves 11 against the tension of its respective spring 31, there is connected to one end of the cam shaft a handle 60. (See Figures 1 and 7.) Secured to the inner end of this handle is a pointer 61 which is adapted to be turned into registry with any one of a number of indications on a segmental dial 62 secured to the casting 1. Referring to Figure 7, at the lower left hand corner of this dial 62 is a small circle opposite which the word "Release" appears. Next above it is a small circle opposite which the numeral "1" is placed. At the top there is a circle opposite which the numeral "2" is printed, and to the right of it is another circle opposite which the numeral "3" is placed. At the lower right hand corner of the dial there is a circle opposite which the word "Full" appears.

When the handle 60 is rotated by the operator to bring the outer end of the pointer 61 over the circle opposite which the numeral "1" appears, the cam surface 18 formed on the shaft 19 (see Figure 8) will press the stem of the valve 11 of the low pressure chamber 8 below its seat to admit to it air which it then delivers to its corresponding secondary chamber 4, by which said air will be applied to the brake line at the uniform pressure predetermined by the adjustment of its spring 56.

When the handle 60 is further rotated to bring the outer end of the pointer 61 over the circle opposite which the numeral "2" appears then the cam surface 63 formed on the shaft 19 will press the stem of the valve 11 in the primary chamber 7 below its seat to admit to it air which is then delivered to its corresponding secondary chamber 3, by which said air will be applied to the brake line at the uniform pressure predetermined by the adjustment of its spring 56.

If the handle 60 is turned to bring the outer end of the pointer over the circle opposite which the numeral "3" appears, then the cam surface 64 formed on the shaft 19 will press the stem of the valve 11 of the primary chamber 6 below its seat to admit to it air which is then delivered to its corresponding secondary chamber 2, by which said air is applied to the brake line at the uniform pressure predetermined by the adjustment of its spring 56.

When the handle 60 is turned to bring the pointer 61 over the circle opposite which the word "Full" appears on the dial, a cam surface 65 formed on the shaft 19 will depress the stem of a valve 11, simliar to the other primary valves 11, below its seat in the chamber 5 to admit air under full pressure to the latter, from which it passes straight through the port 49 at that pressure to the brake line. (See Figure 3.)

When the handle 60 is turned to bring the outer end of the pointer 61 over the circle opposite which the word "Release" appears, the cam surfaces 18, 63 64 and 65 on the shaft 19 will come to positions where the springs 31 will be free to close the valves 11 in the primary chambers 8, 7, 6 and 5 against the entrance of compressed air to them from the compressor. However, there is formed on the cam shaft 19 a cam surface 66 which will, at this time, depress the stem of a valve 11, similar to the primary valves, in the chamber 9, below its seat to open said chamber to an exhaust line 67 that leads from the passage 48 in the casting to the lower portion of said chamber. The air thus exhausted through the ports 45 into the upper portion of the chamber 9 will be discharged through an exhaust tube 68 to the atmosphere. (See Figures 3 and 6.)

Having described my invention, I claim:

1. In a device of the type described, a primary air chamber, a secondary air chamber in communication with the latter, a valve for admitting air under compression to the primary chamber, a valve for admitting said air to the secondary chamber, a flexible sealing member associated with the second valve to engage the walls of the secondary chamber, and automatic means for opening the valve of the secondary chamber to admit more air to the latter from the primary chamber when the pressure of the air in the secondary chamber falls below a predetermined amount.

2. In a device of the type described a primary air chamber, a secondary air chamber in communication with the latter, a valve for admitting air under compression to the primary chamber, a valve for admitting said air to the secondary chamber, a flexible bell-shaped sleeve associated with the second valve for engagement with the walls of the secondary chamber, and a spring for opening the valve of the secondary chamber to admit more air to the latter from the primary chamber when the pressure of the air in the secondary chamber falls below a predetermined amount.

3. In a device of the type described, a chamber having an inlet opening to admit compressed air, a valve adapted to close said opening against the admission of air under compression to said chamber, a stem on said valve projecting upwardly into said chamber, a flexible sleeve loosely surrounding, and secured to, the upper end of said stem, and adapted to be pressed by the compressed air in said chamber against the inner surface of the latter, and resilient means adapted to force the sleeve downwardly against a reduced air pressure within the chamber to move said valve a sufficient distance below said opening to admit air to raise the pressure of the latter within the chamber to a predetermined minimum.

4. In a device of the type described, a chamber having an inlet opening to admit compressed air, a valve adapted to close said opening against the admission of air under compression to said chamber, a stem on said valve projecting upwardly into said chamber, a flexible sleeve loosely surrounding, and secured to, the upper end of said stem, and adapted to be pressed by the compressed air in said chamber against the inner surface of the latter, and a helical spring adapted to force the sleeve upwardly against a reduced air pressure within the chamber to lower the valve a sufficient distance below said opening to admit air to raise the pressure of the latter within the chamber to the minimum predetermined by the tension of said spring.

5. In a device of the type described, a series of primary chambers to receive compressed air, secondary chambers in communication with the primary chambers to distribute said air at a uniform pressure to a brake line, a valve in each primary chamber, a stem for each valve, a single cam shaft, and a cam formed on said shaft for each valve stem, to depress its valve below its seat in its respective chamber when the cam shaft is turned a predetermined distance.

6. In a device of the type described, a plurality of compressed air receiving chambers in horizontal alinement and each having an air-inlet opening in its lower portion, a valve in each chamber for closing the air-inlet opening therein, a stem for each valve projecting upwardly through the top of its respective chamber, a spring for holding each valve against its seat, a rotatable cam shaft horizontally supported above said chambers, and a cam on said shaft for each valve stem to depress the latter below its seat independently of the other valve stems when the shaft is rotated a predetermined distance, for the purpose specified.

7. In a device of the type described, a series of primary chambers, a secondary chamber for each primary chamber and in communication therewith, valve means for each primary chamber to admit air to the latter, and automatic means for discharging said air from the communicating secondary chamber at a uniform predetermined pressure.

8. In a device of the type described, a series of primary chambers, a secondary chamber for each primary chamber and in communication therewith, valve means for each primary chamber to admit air to the latter, and an adjustable spring-controlled valve for automatically discharging said air from the communicating secondary chamber at a uniform predetermined pressure.

9. In a device of the type described, a plurality of chambers, an air line with which each chamber communicates, automatic means in each chamber for discharging air at a uniform pressure less than full pressure into said air line, a full pressure chamber included among the above chambers, and a bypass leading from the full pressure chamber to said air line for the purpose specified.

10. In a device of the type described, a plurality of chambers, adapted to receive compressed air, an air line into which each chamber is adapted to discharge, an exhaust chamber in communication with said air line, and means for opening said air line to the exhaust chamber and simultaneously closing the communication between said remaining chambers and the air line.

11. In a device of the type described, a plurality of horizontally disposed chambers adapted to receive compressed air, an air line into which each chamber is adapted to discharge, an exhaust chamber in line with said first chambers and also in communication with said air line, each chamber having an opening in its bottom portion to admit air thereto, a valve in each chamber for closing said opening, a spring adapted to hold each valve over said opening, a cam shaft rotatably supported above said chambers, a cam on said shaft for each valve stem, said cams being so constructed and positioned that when the cam for the exhaust valve has depressed the stem of the latter to open the exhaust chamber to the air line, the remaining cams will be in a position not to oppose the closing of the valves in the remaining chambers by their respective springs.

12. In a device of the type described, a hollow cylinder, a head closing one end thereof, and formed with an axial hole, a valve stem projecting into said cylinder through said hole, an air inlet in said head adjacent said axial hole, a circular flanged valve seat formed on the outer portion of said head around said air inlet, a cup-shaped valve on the outer end of said valve stem to fit around said flanged seat, a washer in said cup valve, and cushion means for contact with said valve to hold said washer normally against said flanged seat, and means for engagement with the other end of said valve stem to depress the valve below its flanged seat against the pressure of said cushion means.

In witness whereof I have hereunto set my hand this 30th day of August, 1926.

GARWOOD T. BOYNTON.